April 8, 1952 A. B. HILDEBRANDT ET AL 2,592,422
WELL LOGGING APPARENT DIP DETERMINING APPARATUS
Filed May 26, 1950 3 Sheets-Sheet 1

Alexander B. Hildebrandt
Leroy W. Ledgerwood, Jr. Inventors

April 8, 1952 A. B. HILDEBRANDT ET AL 2,592,422
WELL LOGGING APPARENT DIP DETERMINING APPARATUS
Filed May 26, 1950 3 Sheets-Sheet 2

Alexander B. Hildebrandt
Leroy W. Ledgerwood, Jr. Inventors

By W. O. Tilman Attorney

April 8, 1952 A. B. HILDEBRANDT ET AL 2,592,422
WELL LOGGING APPARENT DIP DETERMINING APPARATUS
Filed May 26, 1950 3 Sheets-Sheet 3

Alexander B. Hildebrandt Inventors
Leroy W. Ledgerwood, Jr.
By W. O. J. Heilman Attorney Patented Apr. 8, 1952

2,592,422

UNITED STATES PATENT OFFICE 2,592,422

WELL LOGGING APPARENT DIP DETERMINING APPARATUS

Alexander B. Hildebrandt and Leroy W. Ledgerwood, Jr., Tulsa, Okla., assignors to Standard Oil Development Company, a corporation of Delaware Application May 26, 1950, Serial No. 164,308

5 Claims. (Cl. 33—1)

The present invention relates to a mechanism for computing the apparent dip of strata encountered in a bore hole by a well logging instrument. More particularly, the invention relates to a computer device that will establish three points in space having the same relative position as three points of a stratum in a subsurface formation and that will measure the attitude of a plane passed through the three established points in order to determine the dip and strike of the subsurface formation.

In the constant search for new sources of crude oil many means have been devised for determining whether any possibility of obtaining oil from a particular locality exists but all methods involve considerable expenditure of time and effort and it is therefore desirable to obtain every bit of information that is available when an area is being explored. One valuable source of information regarding the geological structure of a particular area is the bore hole obtained when an oil well is being drilled. Not only is the material removed during drilling examined closely, but the well bore itself is usually subjected to intensive study to determine the nature and position of the various strata encountered. The numerous methods employed in such examination are referred to broadly as well logging methods. One of such methods involves determination of the dip and strike of strata encountered by the bore hole.

The dip of a stratum is defined as the dihedral angle formed by the plane of the stratum and a horizontal plane, and the strike of a stratum as the direction, with respect to the compass, of the line formed by the intersection of the plane of stratification with a horizontal plane. The orientation of a stratum in terms of dip and strike is of considerable value in establishing the general geologic nature of the earth in the area being studied and is useful in predicting the existence of oil deposits and their possible extent.

A basic principle that may be employed for determining dip when profiling a bore hole is that the diameter of a bore hole will vary more or less in proportion to the nature of the various strata encountered. In general this results from the fact that preferential erosion of the various types of strata occurs as the hole is drilled, inasmuch as the different types of sedimentary rocks vary in brittleness and in the eroding effect of the drilling mud on them. Thus, for example, it is known that a shale stratum will give a wider hole than an adjacent sandstone or limestone when drilling a hole of a given size and that, if such a hole is traversed with a profiling instrument, the recorded profile will show good definition between two different types of strata, particularly between a shale and either a limestone or a sandstone. This phenomenon is known to occur consistently.

The variation in diameter of a bore hole as a function of the type of strata encountered enables one to determine the dip and strike of the strata, as will now be explained. Thus, if a measuring device is passed through the bore hole to determine the diameter of the bore hole accurately along the length of the bore hole, it is possible to identify changes in the strata through which the bore hole passes. If this same type of measuring device is modified so as to maintain the device in essentially a central position at all times, and if a plurality of measuring devices arranged in a horizontal plane are used to measure the variation in the distance of the walls of the bore hole from its center, it is possible to determine the inclination of the various strata at particular points in the bore hole.

The simplest illustration of the principle involved can be presented by imagining a measuring device having two profiling arms pivotally attached to the device on opposite sides thereof, the contact points of the profiling arms being in a horizontal plane. As will presently be pointed out, for practical purposes it is necessary to have at least three profiling arms, but for simplicity of the present explanation two arms are imagined. Now, as the measuring device is lowered or raised in the bore hole, assuming the device to be properly centered in the hole, one profiling arm will move inwardly or outwardly, due to a change in diameter of the bore hole caused by a change in strata, before the other profiling arm will make a similar movement, provided the plane of stratification in inclined and provided the vertical plane in which the two profiling arms lie is perpendicular to the line of strike of the particular stratum. It is then a simple matter to determine the angle of inclination or dip of the particular stratum from the measured vertical distance between the points of contact of each profiling arm with the stratum and the measured diameter of the bore hole at these points of contact.

It is apparent from the above that valid measurements can be made only in a case in which the two profiling arms are oriented in a plane perpendicular to the line of strike. Since the direction of strike of underlying strata is one of the unknown pieces of information that it is desired to obtain, it is obvious that an instrument with only two profiling arms would not be practicable unless the instrument were run up and down the hole several times with the profiling arms oriented in a different azimuthal direction each time. If, however, an instrument is used having three or more profiling arms equally spaced around the circumference of the bore hole and having associated therewith means for orienting one of the profiling arms with respect to the compass, sufficient information can be obtained with one traverse of the bore hole to enable a computation of both the dip and strike of strata encountered.

In accordance with these principles, therefore, the dip and strike of strata traversed by a borehole can be determined by logging the borehole with an instrument comprising the following components: Three or more uniformly spaced profile measuring devices together with centering and guiding means to maintain the apparatus in substantially the center of a bore hole and to maintain the apparatus in alignment with the bore hole; an orienting device which will determine the azimuthal orientation of the apparatus; and an inclination detector to determine the inclination of the apparatus from the vertical in the event that it is not in a vertical position. This entire apparatus is to be lowered into a bore hole by means of a cable associated with a suitable measuring device to determine the depth of the apparatus in the bore hole. The cable also includes electrical conductors suitably connected to the profile measuring devices, orienting device, and inclination device so as to permit recording on the surface of the earth of all necessary information in order that the dip and strike of strata traversing the bore hole can be accurately determined. A suitable instrument of this type is described and claimed in co-pending application Serial No. 90,324, of Frank G. Boucher, filed April 29, 1949.

One object of the present invention is to provide a computing device that can be employed to compute the apparent dips of subsurface strata from a record chart obtained with a well logging instrument of the type described above. It is a further object of the invention to provide a computer that will establish three points in space having the same relative positions as three points measured in a subsurface formation by a well logging instrument and that will measure the attitude of a plane passed through these three established points to determine the indicated dip of said subsurface formation.

Still another object of the invention is to provide a mechanism into which can be indexed the indicated displacement from the center of a borehole of at least three circumferentially spaced profiling arms, the indicated vertical distance between the points of contact of each profiling arm with a particular subsurface stratum and the indicated orientation of one of the profiling arms with respect to the compass, so that after proper manipulation of the instrument the magnitude and direction of the dip of a particular stratum can be read directly from scales on the computing device.

Other and further objects of the invention, as well as the particular nature of the computing device, can be ascertained from the ensuing description and from the accompanying drawing in which Fig. 1 is an elevational view of the assembled computing device with portions of the structure cut away to illustrate interior details;

Figure 6:
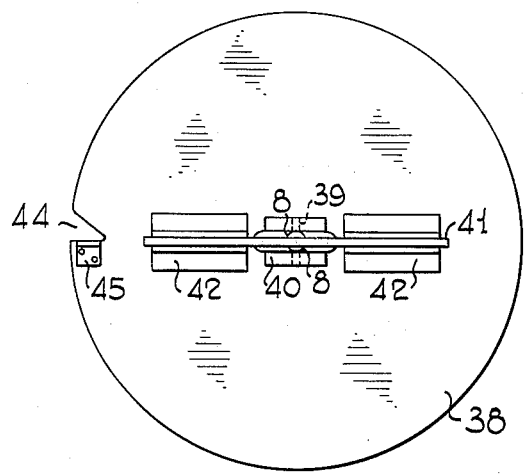
Figure 7:
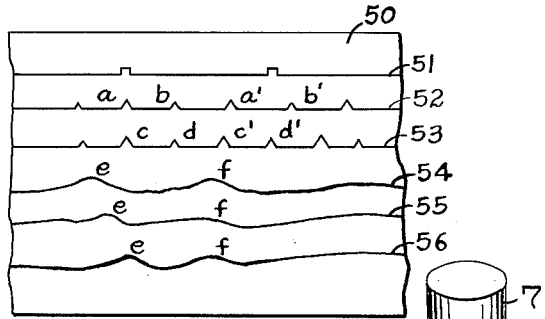
Figure 5:
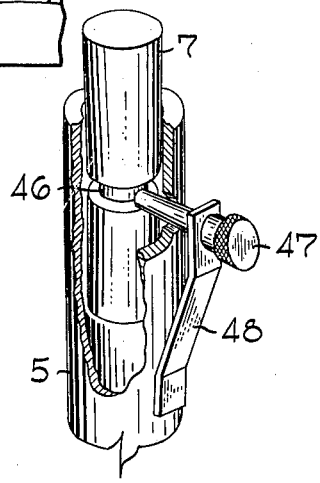

Fig. 5 is an enlarged perspective view, partly in section, of portions of shafts 5 and 7, with shaft 7 extended to its uppermost position;

Fig. 6 is a top view of the plane plate and dip scale plate assembly with the plane plate in horizontal position; and Fig. 7 is a section of a typical record chart from which values can be taken for use with the computing device of this instrument.

Briefly it may be stated that the computing device of this invention comprises a base, an azimuthal scale positioned in a horizontal plane on the base, a rotatable member supported by the base with its center of rotation coincident with the center of the azimuthal scale, at least three vertically extendable arms supported by the rotatable member in a manner adapting them for lateral movement in vertical planes equally spaced radially about the center of rotation of the rotatable member while the arms remain vertical at all times, a central shaft held vertically by the rotatable member over its center of rotation, the central shaft being adapted for both rotational and slidable movement with respect to the rotatable member, a vertical pointer attached to the top of the central shaft, a circular plate pivotally supported at its center by the central shaft below the pointer, a semicircular plate positioned adjacent the pointer and attached to the circular plate in a plane perpendicular to the circular plate, and passing through the centerline of the plate that is perpendicular to the axis on which the latter is pivotally attached to the central shaft, and an index pointer attached to the rotatable member adjacent the azimuthal scale. Suitable scales are provided on the instrument to indicate lateral displacement of the extendable arms with respect to the central shaft as well as vertical extension with respect to a selected datum point. A scale is also provided on the semicircular plate adjacent the vertical pointer to indicate the dihedral angle formed by a horizontal plane and the plane of repose of the circular plate. When the extendable arms have been properly manipulated to incorporate profiling data obtained from a suitable well logging chart and the circular plate is resting on the tops of the extendable arms, the aforementioned dihedral angle will represent a measured angle of dip. Sighting means on the edge of the circular plate may be lined up by the observer's eye with a mark on the azimuthal scale to obtain a reading indicative of the direction of dip, provided the index pointer adjacent the azimuthal scale has been moved to a position corresponding to an azimuthal orientation of a known point of the well logging instrument employed to obtain the well logging profile data referred to.

Figure 1:
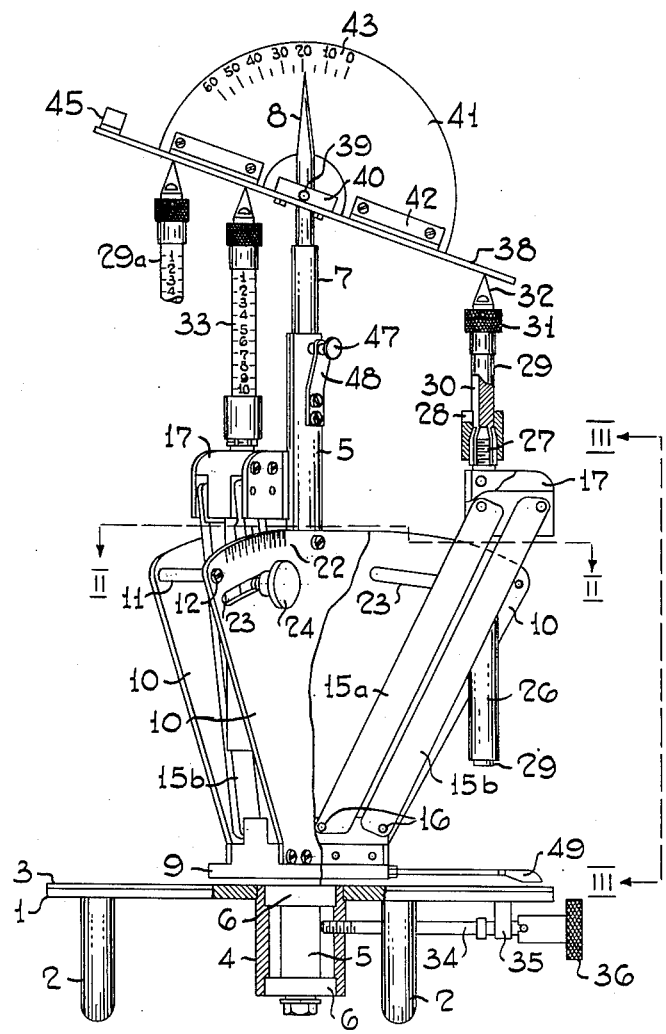
Figure 2:
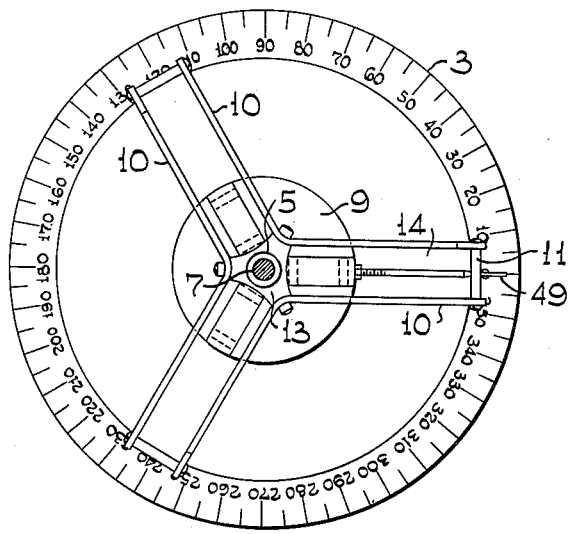
Fig. 2 is a top view of the device taken below line II—II of Fig. 1 with the linkage arms removed.

With particular reference to Figs. 1 and 2, it will be seen that the device is provided with a flat circular base 1 supported on legs 2. Attached to the upper side of base 1 is a circular scale 3 marked off in angular degrees. Centrally placed on base 1 is a bearing housing 4 into which is rotatably fitted a vertical hollow shaft 5 supported on bearings 6. Slidably and rotatably fitted within hollow shaft 5 is an extensible shaft 7 terminating at its upper end in a pointer 8. Attached to the lower portion of hollow shaft 5 is a plate support 9 to which are fastened at their lower ends three radius scale plates 10, each of which is bent along a vertical central line so as to define two planes 120° apart. Each of the plates 10 is fastened at its upper end to center spacer 13 provided on shaft 5. Spacing rods 11 are placed between the outer ends of adjacent plates 10 and the plates are fastened thereto with screws 12. Thus the scale plates define three vertical spaces 14 furnishing planes of motion 120° apart. Movably placed within each of the spaces 14 are two pairs of parallel linkage arms 15a, 15b, etc. pivotally attached at their lower ends to plate support 9 by means of pins 16. The parallel linkage arms 15 are pivotally attached at their upper ends to riders 17.

Figures 3, 4:
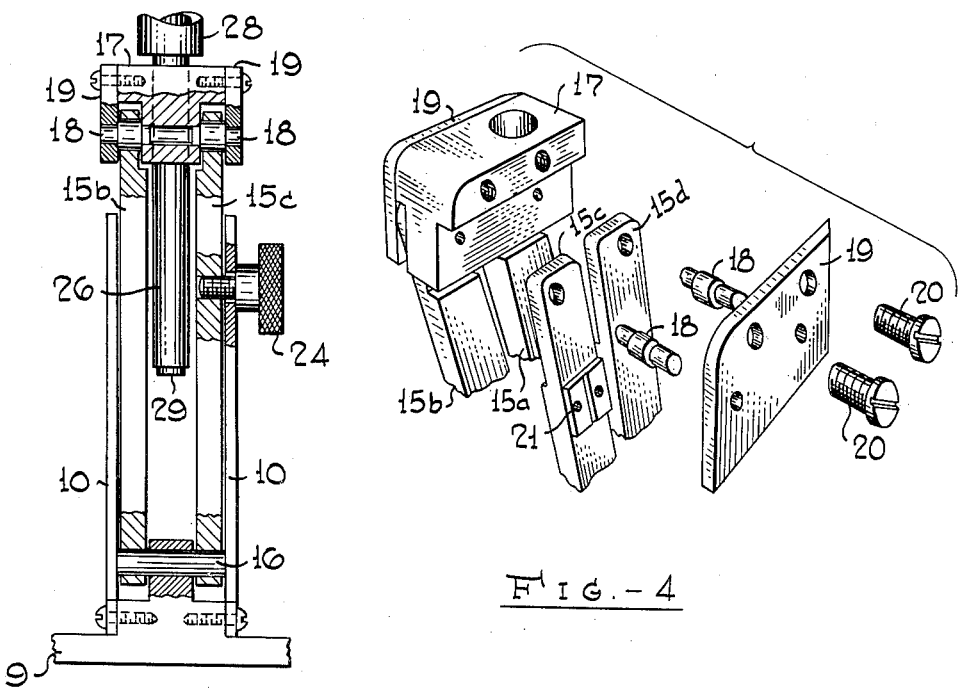
Fig. 3 is a side view, partly in section, taken in the direction of line III—III of Fig. 1.
Fig. 4 is an exploded view of a detail of the rider assembly and parallel linkage arms shown in Fig. 1.

The manner in which arms 15a and 15b, etc. are pivotally attached to rider 17 and to plate support 9 is clearly shown in Figs. 3 and 4, the former being a side elevation view taken in the direction of line III—III of Fig. 1 and the latter an exploded view of the rider assembly. In Fig. 3 sections have been taken at the upper and lower pivot points of arms 15b and 15c and through locking nut 24. As shown in Fig. 4, arms 15 are attached to rider 17 by means of bearing pins 18 and are held in place by rider plates 19, attached to rider 17 with screws 20.

Vertically set within each of the riders 17 is a sleeve 26 into which is slidably placed a displacement arm 29. The upper end of each sleeve 26 is provided with an external taper and has a number of vertical slits 27. The slit end is threaded to receive a tapped ferrule 28 having an internal taper so that as the ferrule is screwed down onto the end of sleeve 26 the slit end will grip arm 29 and prevent slidable movement thereof. Arm 29 is provided with a longitudinal keyway 30 into which a portion of ferrule 28 extends so that when arm 29 is rotated ferrule 28 will likewise rotate. A knurled knob 31 is provided on the upper end of each of the arms 29 to facilitate rotation thereof with the fingers. The upper end of each of the arms 29 is tapped to receive a threaded tapered tip 32. Each of the arms 29 is provided with a numbered scale 33 whose function will be described later in the specification. The purpose of threading tips 32 is to provide for proper zero adjustment of the effective length of arms 29 as measured by scales 33.

For clarity of illustration, arm 29a is shown displaced somewhat beyond its normal outermost position and only the uppermost portion is shown, the supporting rider and related structure having been omitted from the drawing. Their location in the device can readily be ascertained, however, from Fig. 2.

It will be seen that by virtue of the arrangement of the parallel pairs of linkage arms 15, each of the riders 17 may be moved toward and away from shaft 5 within space 14 and that, regardless of the position of the riders, displacement arms 29 will always be in a vertical position parallel to shafts 5 and 7. Each of the scale plates 10 is provided with a slot 23 through which extends a locking thumb screw 24 attached to linkage arm 15c. Thus each of the riders 17 may be fixed against movement at any desired point. A scale 22 is marked off along an upper edge of scale plate 10. A rider index plate 21 is attached to arm 15c in a position which will enable it to move along the upper edge of scale plate 10 adjacent the scale 22. The function of the scale and index will be explained later.

Shaft 5 may be locked against rotational movement by means of locking screw 34 which extends into bearing housing 4 and is supported by bracket 35 attached to base 1. A knurled knob 36 is provided to facilitate the setting of locking screw 34 against shaft 5 when desired. Knob 36 may be of a removable type, as shown, to enable the instrument to be placed in a carrying case of minimum dimensions.

Attached to the upper end of extensible shaft 7 and just below pointer 8 is a dip plane plate 38 which is held by brackets 40 pivotally mounted on pivot 39 set into the shank of pointer 8. A dip scale plate 41 is attached to plane plate 38 by means of brackets 42 and is set in a plane vertical to the plane of plate 38 and passing through a center line thereof. This may be more clearly seen by reference to Fig. 6 which is a top view of the plane plate and dip scale plate assembly when the plane plate is in a horizontal position.

A dip scale 43 is marked off in degrees on one-half of dip scale plate 41. Adjacent the end of the scale plate 41 that is provided with scale 43, a sight hole 44 is cut into the edge of plane plate 38 and has a straight edge along the line of intersection of plane plate 38 and scale plate 41. To aid in sighting, a sight guide 45 may be provided having a vertical side lying in the same plane as dip scale plate 41.

As shown in Fig. 6, pointer 8 may be bifurcated so that its two halves straddle dip scale plate 41, thus enabling dip scale 43 to be marked off on both sides of the same half of scale plate 41, making it convenient to read the scale from either side of the instrument.

For convenience in adjusting the position of riders 17 and displacement arms 29, extensible shaft 7 may be provided with means for holding it in its fully extended position when desired, to keep plate 38 out of the way when making adjustments to the riders and radius arms. One means for accomplishing this is shown in Fig. 5. A groove 46 is provided adjacent the lower end of shaft 7, engageable with catch 47 which is urged inwardly by spring 48.

The function of the computing device as described above will now be explained. In Fig. 7 is shown a portion of a typical record obtained with a well logging device having three uniformly spaced profiling arms together with an orientation device and an inclination detector as mentioned previously. The chart paper 50 carries a plurality of traces showing the fluctuations of recording galvanometers controlled by the profiling arms, orientation device and inclinometer. In addition to these traces a record of the depth of the well logging apparatus in the bore hole is also made, the markings produced being indicated by the line 51. The notches in line 51 appear periodically to indicate distances on the record paper corresponding to a given depth of the instrument in the well. For example, a notch will appear for each 10 ft. the apparatus travels up the bore hole. Line 52 depicts a representative trace obtained with the inclinometer unit and line 53 represents the type of trace produced by the orientation detector. Preferably, for ease of calculation, chart paper 50 is moved past the recording galvanometers at a speed proportional to the logging speed, i. e., the speed of travel of the well logging instrument through the borehole when the log is being made.

As described fully in the aforementioned copending application of Frank G. Boucher, Ser. No. 90,324, filed April 29, 1949, the inclination of the instrument in the bore hole can be determined by relating the distance between kicks $a$ and $a'$ and between kicks $a$ and $b$ on line 52. Similarly, as described in the Boucher application just referred to, the orientation of one of the profiling arms with respect to a selected point on the compass can be determined from the relative positions of kicks $c$ and $d$ on trace 53. Suitable apparatus for measuring inclination and orientation wherein traces of this character are produced are also described and claimed respectively in co-pending applications, Ser. No. 72,515, of Alexander B. Hildebrandt, filed January 24, 1949 and Ser. No. 123,892, of Frank G. Boucher and Alexander B. Hildebrandt, filed October 27, 1949.

Having now established from the record of Fig. 7, the depth of the apparatus, the orientation of the profiling arms, and the inclination of the apparatus, it remains only to interpret the records of the profiling arms indicated by traces 54, 55 and 56. These lines represent a profile of the bore hole traced by each of the three arms. It will be noted on the record that two erosion-resistant strata are indicated. Because of the sequence in which the profiling arms touched the strata, it appears that the uppermost stratum indicated by waves $e$ is slightly inclined, while the stratum indicated by waves $f$ is in essentially the same plane as the three arms. It must be remembered, of course, that the inclination of the well logging device in the hole must be accounted for in determining the actual incline of each stratum so that the stratum indicated by traces $f$ is not necessarily horizontal but lies in the plane through the profiling arms determined by the inclination of the apparatus at the depth indicated.

For an accurate determination of the dip and strike of strata from a record such as that shown, the following principles may be employed. It is generally most convenient to neglect for the moment the inclination of the apparatus in the borehole and to find the dip of each stratum with the assumption that the apparatus is vertical. When this has been done, by rotating the established plane in accordance with the inclination of the apparatus, the actual orientation of the particular stratum may be found. In carrying this out, the vertical distance between contact of each profile arm with a particular stratum may be found by referring to the depth markings shown by trace 51. The distance of each arm from the center of the well logging instrument may be found, provided the record has been calibrated to show this. Thus vertical reference lines may be drawn on the record adjacent to the actual line drawn by the recording means of the galvanometer associated with each profile arm to show the actual extension of the arm. By also knowing the orientation of each arm as formerly described, the position of the stratum may be computed using the apparatus of the present invention.

For convenience in calibrating the device of the present invention it is desirable to construct the model on a scale proportioned to the dimensions of the well logging device that has been used in making the records from which the calculations of the apparent dip are to be made. For example, a scale of $\frac{3}{16}$ could be used, which would mean that the length of the parallel linkage arms 15a and 15b from pivot 16 to pivot 18 would be $\frac{3}{16}$ of the length of the profiling arms on the well logging device. Likewise arm 15a would have its pivot point 16 set out from the center line of shaft 7 a distance equal to $\frac{3}{16}$ the distance of the pivot of the profiling arm on the well logging instrument from the center line of that instrument. Each of the arm radius scales 22 can thus be calibrated by moving the rider 17 to the various positions and marking off on scale plate 10 a scale reading 16/3 of the actual perpendicular distance between the center line of arm 29 and the center line shaft 7. Likewise the vertical scales 33 on each of the arms 29 can be marked off on the basis of $\frac{3}{16}''=1''$.

The actual manipulation of the instrument is relatively simple. From the measured distance of each of the profiling arms from the center line of the well logging instrument as indicated on chart 50, each of the riders 17 can be set at a corresponding distance as measured on its scale 22. Each rider is then locked in place by means of thumb screw 24. It should be noted in this connection that in the embodiment of the device as described in Figs. 1 and 2 each of the riders can be manipulated and locked with one hand by grasping the thumb screw in a loosened position, moving it in the desired direction and then tightening it by turning it through a fraction of a turn.

After each rider has been locked in place in the manner described each of the displacement arms 29 is then moved vertically a distance corresponding to the indicated vertical distance between a horizontal plane of reference and the points of contact of each of the profiling arms with a particular stratum as determined from the traces 54, 55 and 56 on record paper 50. Conveniently the scales 33 on the displacement arms 29 are adjusted with the top of the ferrule 28 as the reference datum point. As mentioned previously, a longitudinal keyway 30 is cut into arm 29 so that by grasping knurled knob 31 with the fingers, arm 29 can be released for slidable movement by turning knob 31 slightly and can then be locked in the desired position by turning the knob slightly in the opposite direction. It is thus apparent that with the instrument designed as described the operator can use the right hand for setting the rider 17 and the left hand for setting arm 29 in the desired position, thus eliminating lost motion on the part of the operator in reaching for the controls, making for speed in the computing of apparent dips with this instrument.

After the riders and displacement arms have been clamped in the desired positions the entire upper assembly is rotated on bearings 6 to set index pointer 49 opposite an azimuthal reading on scale 3 which corresponds to the orientation of one of the profiling arms of the well logging device as determined from trace 53 of chart 50. The settings of the particular arm 29 and rider 17 that are directly over index pointer 49 on the computer will, of course, be those determined for the well logger profile arm whose orientation is known.

After the index pointer has been moved to the desired point the instrument is held against rotation by setting locking screw 34. In order to establish the plane through three points at the ends of the arms 29, dip plane plate 38 and shaft 7 are now rotated and plate 38 is turned on pivot 39 so that it will touch the pointed tips of all three arms. Furthermore, in order that the proper dip reading may be read, plate 38 must be rotated in such a manner that when all three arm tips touch the plate, dip scale 43 will be adjacent pointer 8. The degree of down dip can then be read directly from scale 43. The direction of down dip with respect to the compass can then be determined by sighting vertically downward through sight hole 44 and reading the degree mark on scale 3 that most nearly parallels the aforementioned straight edge provided in sight hole 44, which is coincident with the line of intersection of scale plate 41 and plane plate 38.

Scale 3 is marked off in angular degrees in a counterclockwise direction rather than in the familiar clockwise direction for the reason that the well logging data indexed into the computer for each profile arm are in inverse relation to the sequence in which they were obtained by the instrument in the well. This results from the fact that in the computer the linkage arms 15 are pivoted at the bottom of the instrument whereas, in the well logging device for which the specific embodiment of the computer herein described has been designed, the profiling arms are pivoted at their upper ends, as described in the aforementioned Boucher application, Serial No. 90,324. Hence, when one looks at the computer from the top it is analogous to looking at the well logging device upwardly from the bottom.

It is not intended that this invention be limited to the specific embodiments herein described, for obvious modifications thereof can be made by persons skilled in this particular art without departing from the spirit of the invention, whose scope is defined in the following claims.

What is claimed is:

1. A device for computing the angle and direction of apparent dip of strata encountered by a borehole from indicia relating displacement of at least three uniformly spaced profiling arms in contact with the borehole in relation to the center thereof and the azimuthal orientation of one of said arms, comprising a base, an azimuthal scale positioned in a horizontal plane on said base, a rotatable member supported on said base with its center of rotation coincident with the center of said scale, at least three vertically extendable arms supported by said rotatable member, means for moving said arms laterally in vertical planes equally spaced radially about said center of rotation, while maintaining said extendable arms at all times in a vertical position, scale means supported by said rotatable member adjacent said means for moving said extendable arms laterally and provided with scales indicative of lateral displacement of said arms from said center of rotation, a central shaft held vertically by said rotatable member over said center of rotation and adapted for both rotational and slidable movement with respect to said rotatable member, a vertical pointer attached to the top of said central shaft, a circular plate pivotally supported at its center by said central shaft below said pointer, said plate being of sufficient size to rest on the upper ends of said extendable arms when said central shaft is moved downwardly relative to said rotatable member, a semicircular plate attached to said circular plate adjacent said pointer and positioned in a plane perpendicular to said circular plate, and passing through the centerline thereof that is perpendicular to its pivotal axis, and an index pointer attached to said rotatable member adjacent said azimuthal scale, each of said extendable arms being provided with scales indicative of vertical extension from a selected datum point, and said semicircular plate being provided with a scale adjacent said vertical pointer indicative of the dihedral angle formed by a horizontal plane and the plane of repose of said circular plate.

2. Device according to claim 1 including a locking device held by said base adapted to lock said rotatable member against rotation.

3. Device according to claim 1 including a locking device adapted to hold said central shaft in fully extended position.

4. Device according to claim 1 including sight guide means on the periphery of said circular plate adapted to line up the vertical plane of said semicircular plate visually with markings on said azimuthal scale.

5. A device for computing the angle and direction of apparent dip of strata encountered by a borehole from indicia relating displacement of at least three uniformly spaced profiling arms in contact with the borehole in relation to the center thereof and the azimuthal orientation of one of said arms, comprising a base, an azimuthal scale supported in a horizontal plane on said base, a rotatable member supported on said base with its center of rotation coincident with the center of said scale, said rotatable member having an elongated hollow tube portion extending vertically from its center, at least three rider members provided with elongated tubular sections, at least three sets of linkage arms, each arm pivotally attached at one of its ends to said rotatable member and at the opposite end to one of said rider members in a manner adapted to maintain the elongated tubular section of said rider member in a vertical position regardless of the pivotal movement of said arms, said sets of arms being arranged to move pivotally in vertical planes equally spaced radially about the center of rotation of said rotatable member, a central shaft slidably and rotatably fitted within said central elongated hollow tube portion of said rotatable member, a plurality of shaft members, equal in number to said rider members, slidably held by the elongated tubular sections of said rider members, and provided with scales indicative of vertical extension from a selected datum point on said rider member, locking means adapted to fix said last named shaft members against slidable movement within said tubular sections, locking means adapted to fix said linkage arms against lateral movement in said vertical planes, scale plates held by said central rotatable member and provided with scales indicative of lateral displacement of said rider members from the vertical center line of said rotatable member, a vertical pointer attached to the top of said central shaft, a circular plate pivotally attached at its center to said central shaft below said pointer, a semicircular plate attached to said circular plate adjacent said pointer and positioned in a plane passing perpendicularly through the center line of said circular plate, sight guide means on the periphery of said circular plate adapted to line up said last named vertical plane visually with markings on said azimuthal scale, and an index pointer attached to said rotatable member adjacent said azimuthal scale, said semicircular plate being provided with a scale adjacent said vertical pointer indicative of the dihedral angle formed by a horizontal plane and the plane of repose of said circular plate.

ALEXANDER B. HILDEBRANDT.
LEROY W. LEDGERWOOD, JR.

REFERENCES CITED

The following references are of record in the file of this patent:

UNITED STATES PATENTS

| Number | Name | Date |
|---|---|---|
| 1,921,508 | Dawson | Aug. 8, 1933 |
| 2,089,216 | Lynton | Aug. 10, 1937 |
| 2,149,715 | Pearson | Mar. 7, 1939 |
| 2,357,617 | Subkow et al. | Sept. 5, 1944 |
| 2,496,422 | Subkow | Feb. 7, 1950 |